United States Patent [19]

Tsai

[11] 4,440,123
[45] Apr. 3, 1984

[54] HALF SPEED BALANCER

[75] Inventor: Lung-Wen Tsai, Troy, Mich.

[73] Assignee: General Motors Corporation, Detroit, Mich.

[21] Appl. No.: 343,450

[22] Filed: Jan. 28, 1982

[51] Int. Cl.³ .......................................... F16F 15/26
[52] U.S. Cl. .......................... 123/192 B; 123/192 R; 464/104; 464/105; 464/180; 74/573 R; 74/574; 74/603; 74/604
[58] Field of Search ........... 123/197 R, 192 B, 192 R; 464/7, 104, 105, 180; 74/572, 573 R, 574, 603, 604

[56] References Cited

U.S. PATENT DOCUMENTS

| | | | |
|---|---|---|---|
| 1,459,035 | 6/1923 | Raisig | 464/105 |
| 1,807,798 | 3/1925 | Short | 74/574 |
| 1,948,708 | 2/1934 | Grundy | 464/102 |
| 2,007,513 | 7/1935 | Westburgh | 464/102 |
| 2,214,921 | 9/1940 | Criswell | 74/604 |
| 2,218,580 | 10/1940 | Kennedy | 464/7 |
| 2,513,684 | 9/1950 | Shenk | 464/102 |
| 3,511,110 | 5/1970 | Grieve | 74/604 |
| 3,606,768 | 9/1971 | Wildhaber | 464/103 |
| 3,667,317 | 6/1972 | Hillingrathner | 74/604 |
| 3,710,774 | 1/1973 | Weseloh et al. | 123/192 B |
| 4,095,579 | 6/1978 | Iwasa et al. | 123/192 B |
| 4,300,493 | 11/1981 | Berti | 123/192 B |
| 4,329,968 | 5/1982 | Ishikawa et al. | 123/192 R |

FOREIGN PATENT DOCUMENTS

| | | | |
|---|---|---|---|
| 2822589 | 11/1979 | Fed. Rep. of Germany | 74/603 |
| 572621 | 10/1945 | United Kingdom | 464/102 |
| 2065781 | 12/1979 | United Kingdom | 74/603 |

Primary Examiner—Ira S. Lazarus
Assistant Examiner—R. S. Bailey
Attorney, Agent, or Firm—Robert J. Outland

[57] ABSTRACT

A half speed balancer for unbalanced mechanisms such as internal combustion engines comprises an Oldham coupling device with a central coupler that orbits in a curved (usually circular) path at a frequency twice the speed of the coupling rotation. The balancer substitutes for an equivalent rotating eccentric weight when driven at only half the rotational speed thus causing reduced bearing friction and noise and may be used in multiples like eccentric weights to offset various unbalance conditions.

6 Claims, 8 Drawing Figures

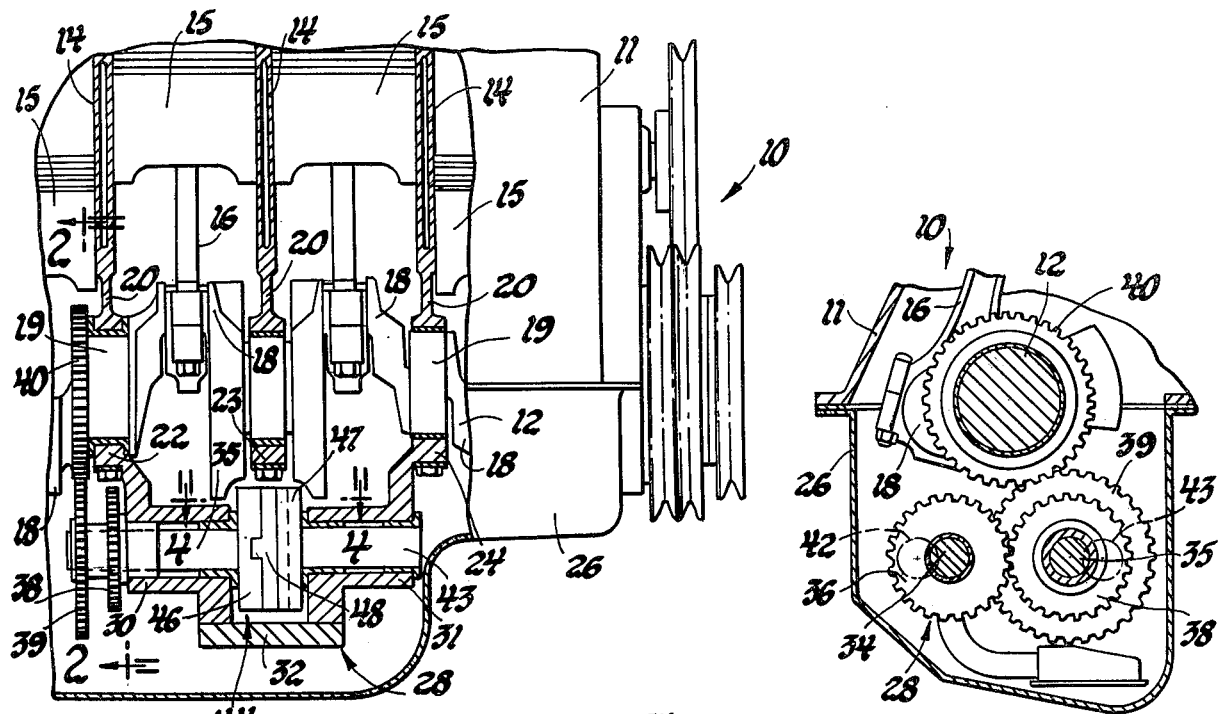
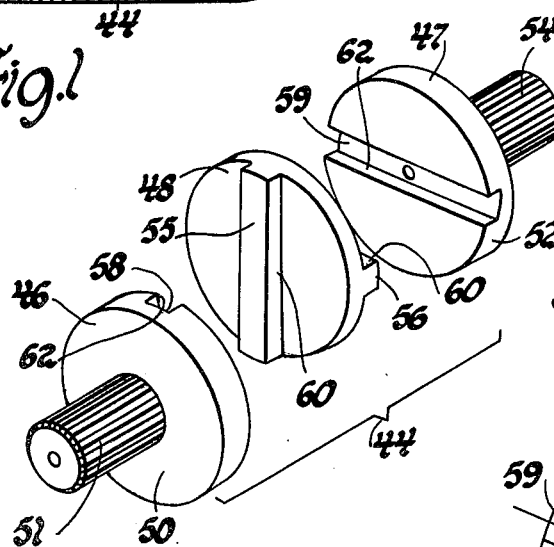
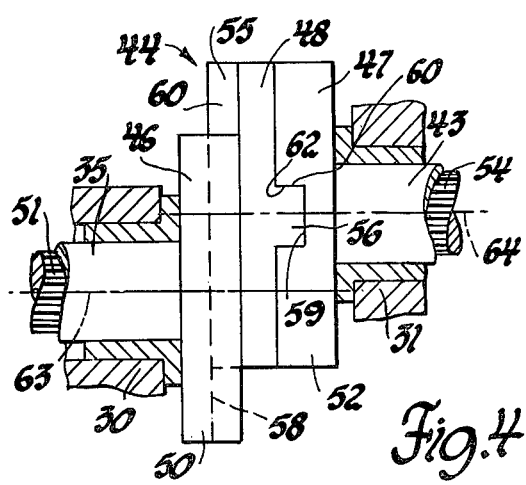
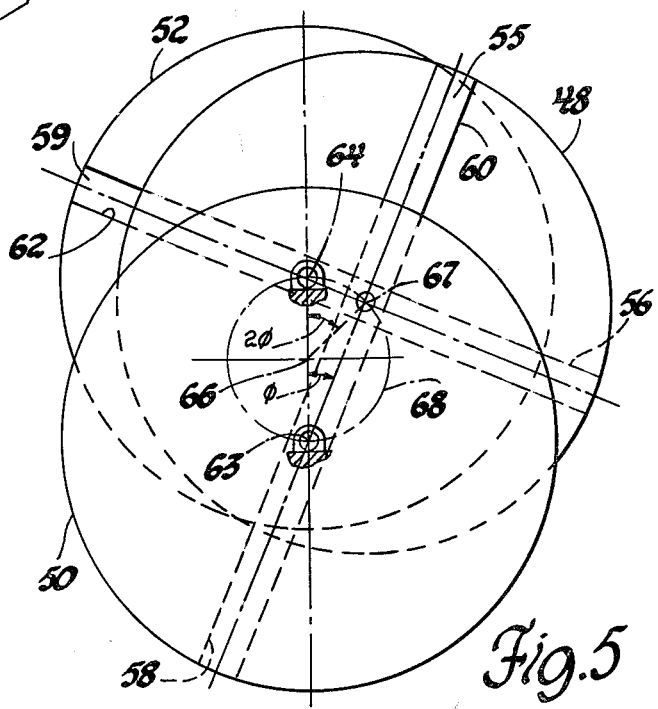
Fig.1  Fig.2  Fig.3  Fig.4  Fig.5

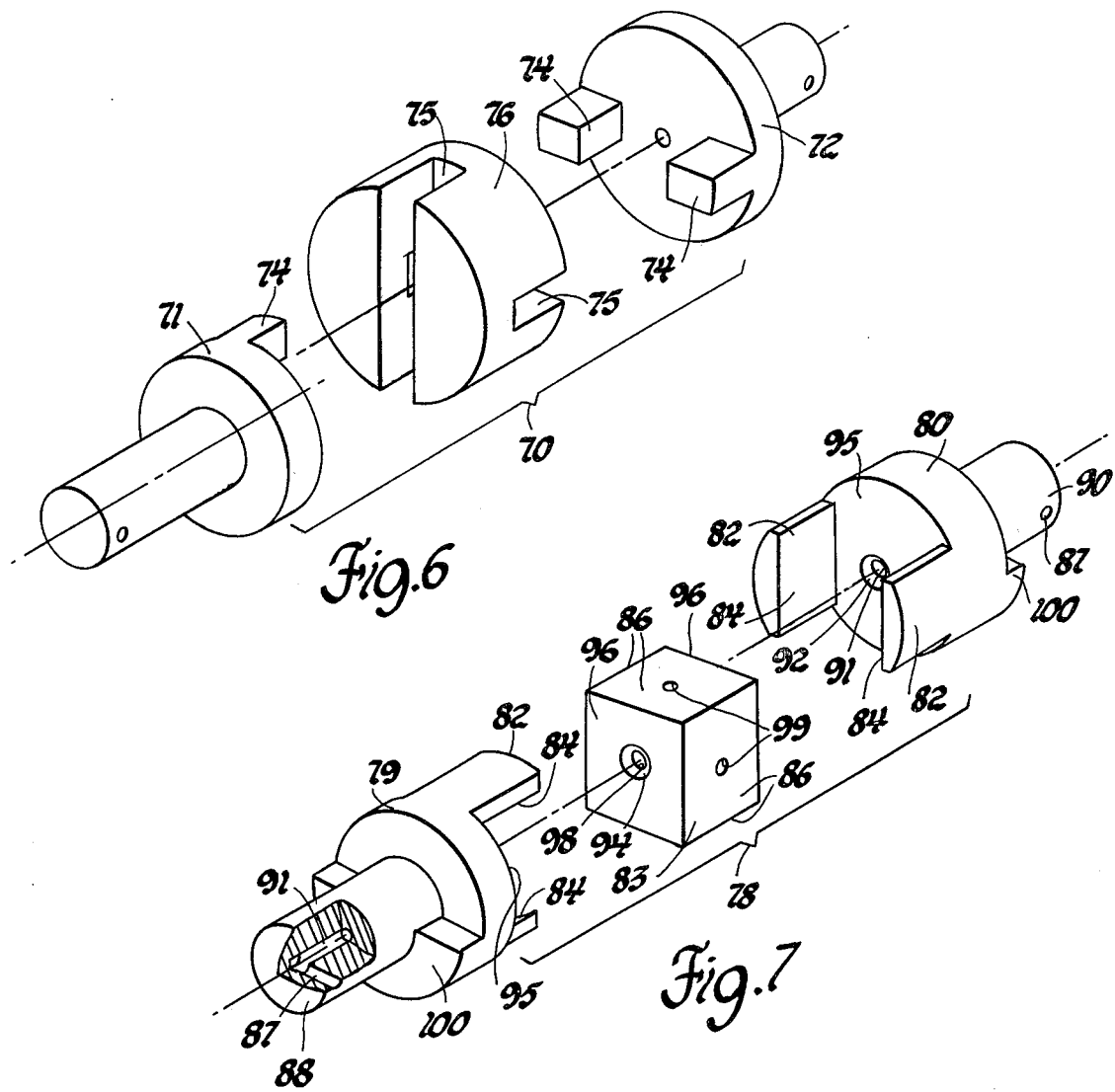
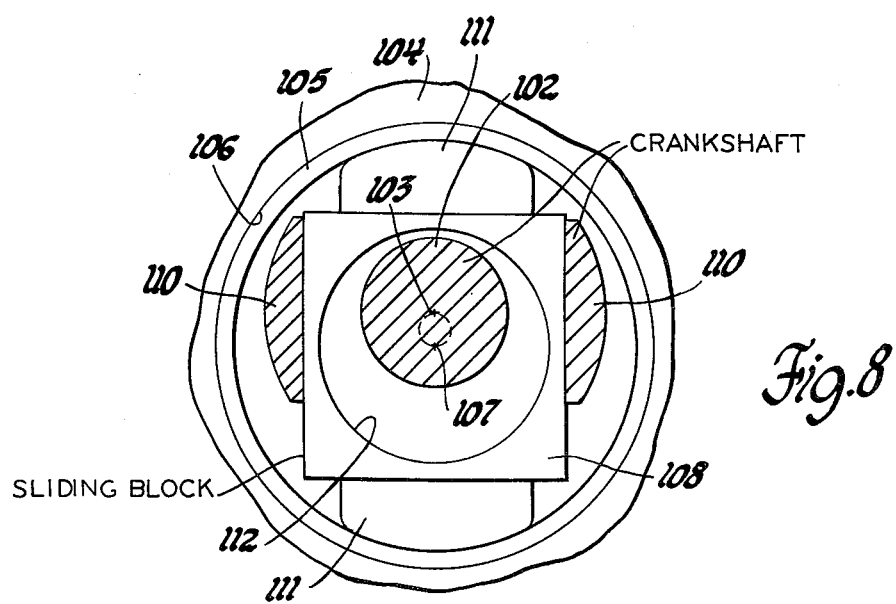

4,440,123

HALF SPEED BALANCER

TECHNICAL FIELD

This invention relates to rotating eccentric balancers and more particularly to an application of modified Oldham coupling devices having suitable mass in an eccentric coupler to provide an efficient low noise half speed balancer for cyclically unbalanced mechanism such as in internal combustion engines.

BACKGROUND

One of the problems associated with mechanisms such as reciprocating piston engines is that of balancing inertia shaking forces and moments that act on the engine supports due to the moving masses. These shaking forces and moments may cause vibration with accompanying noise and stress on various parts of an engine and its mountings.

The various types of unbalance forces existing in engines having various cylinder arrangements have been extensively analyzed in the prior art. For example, an in-line two cylinder four stroke cycle engine may have first order and second order shaking forces but no shaking moments, an inline four cylinder engine normally exhibits a second order vertical shaking force, and a 60° V-6 engine conventionally has a second order shaking couple.

First order shaking forces and moments are usually able to be balanced by the addition or removal of mass from various parts of the mechanism such as the crankshaft of an engine or the components attached thereto. This selective addition of weight may be referred to as "passive" balancing, since it requires no added mechanism. Second order shaking forces and moments are more difficult to balance because they vary at twice the speed or frequency of the engine crankshaft rotation. Therefore, an "active" balancing arrangement utilizing additional balance shafts or devices is usually required. It is well, known to obtain such balancing by providing means such as a pair of counter-rotating shafts having eccentric weights; however, because these counterbalancing shafts must run at twice the engine speed, they often cause excessive friction at the bearings and contribute to noise due to gearing or other mechanical drive arrangements between the balance shafts and the engine crankshaft.

SUMMARY OF THE INVENTION

The present invention advantageously applies a little recognized and usually undesirable property of the known Oldham coupling mechanism wherein a coupler member, acting between end members having parallel offset axes, orbits in a circular path at twice the rotational speed of the coupling. The balancer of this invention, in its simplest form, consists of a particularized form of Oldham coupling mechanism in which the mass of the coupler and the offset of the shaft axes (both usually minimized) are suitably chosen to provide an eccentric balancing mass capable of balancing cyclic unbalance forces having twice the rotational speed of the coupling. In this way the problems of friction and noise associated with conventional second order balancing devices are reduced by provision of a half speed balancer which is capable of balancing secondary (twice speed) vibrations while rotating at the primary operating speed of the mechanism or engine with which it is associated.

Various arrangements of multiple couplings may be utilized in much the same manner as multiple eccentric weights on one or more balance shafts to provide balancing of various secondary shaking forces and moments. Further, eccentric weights can be added to portions of the coupling end members or the attached shafts to provide additional primary balancing forces, effective at the shaft's rotating speed.

These and other features and advantages of the invention will be more fully understood from the following description of various embodiments and applications taken together with the accompanying drawings.

BRIEF DRAWING DESCRIPTION

In the drawings:

FIG. 1 is a fragmentary side view of a four cylinder in-line internal combustion engine having portions broken away to show the application of a half speed balancer in accordance with the present invention;

FIG. 2 is a cross-sectional view of the balancer drive gears from the plane indicated by the line 2—2 of FIG. 1;

FIG. 3 is an exploded pictorial view of one of the coupling portions of the half speed balancer of FIGS. 1 and 2;

FIG. 4 is a top view of one of the assembled couplings as viewed from the line 4—4 of FIG. 1;

FIG. 5 is a diagrammatic end view illustrating the operation of the type of coupling illustrated in FIGS. 3 and 4;

FIG. 6 is an exploded pictorial view similar to FIG. 3 but showing an alternative embodiment of coupling balancer;

FIG. 7 is an exploded pictorial view illustrating still another embodiment of coupling type balancer, and FIG. 8 is a transverse cross-sectional view illustrating yet another embodiment of coupling balancer in accordance with the invention.

DETAILED DESCRIPTION

Referring first to FIGS. 1 and 2 of the drawings, numeral 10 generally indicates a four cylinder, four stroke cycle internal combustion engine having a cylinder block 11 rotatably supporting a crankshaft 12. The cylinder block further defines four cylinders 14 having pistons 15 reciprocably disposed therein and connected by connecting rods 16 with throws 18 of the crankshaft. The crankshaft is supported at longitudinally spaced bearing journals 19 by bulkheads 20 of the cylinder block having removable main bearing caps, three of which 22, 23, 24 are illustrated. An oil pan 26 secured to the bottom of the cylinder block encloses the lower portion of the engine crankcase and provides a sump for lubricating oil.

Engine 10 further includes a half speed balancer 28 formed in accordance with the invention for balancing the secondary shaking force of the four cylinder four stroke cycle engine. Balancer 28 is secured to the cylinder block at the longitudinal center of the engine, below the crankshaft and within the oil pan. The balancer includes a pair of bearing housings 30, 31 which are formed integrally with the engine main bearing caps 22, 24 and extend below and longitudinally inwardly thereof, being connected at their lower ends by a connecting plate 32. The rear bearing housing 30 rotatably journals a pair of laterally spaced longitudinally extending parallel shafts 34, 35 which are interconnected by like sized gears 36, 38, respectively, mounted on the ends of the shafts 34, 35 outward of the bearing housing 30. Shaft 35 is also drivingly connected with the engine crankshaft by a pair of like sized gears 39, 40 mounted on the shaft and the crankshaft respectively.

Bearing housing 31 in turn journals a pair of laterally spaced longitudinally extending parallel shafts 42, 43. These shafts lie in a common horizontal plane with shafts 34, 35, but are laterally offset therefrom. Shaft 42 lies parallel with but laterally offset outwardly a predetermined amount from its corresponding shaft 34 while shaft 43 lies parallel to but laterally offset outwardly by the same predetermined amount from its corresponding shaft 35. The two sets of related, or corresponding, shafts 34, 42 and 35, 43 are interconnected by balance force producing Oldham coupling devices 44 formed in accordance with the invention.

Coupling devices 44 as shown in FIGS. 3 and 4 each include a pair of end members 46, 47 rotatably connected by a coupler 48. End member 46 includes an input disc 50 connected with an axially extending splined input shaft 51 which is adapted to be connected with the associated balancer shaft 35. End member 47 likewise includes an output disc 52 having axially extending therefrom a splined output shaft 54 which is adapted to be connected with the associated balancer shaft 43. Coupler 48 is also constructed as a disc which lies between the input and output discs 50, 52. Coupler 48 is connected to discs 50, 52 by a pair of laterally extending tongues 55, 56 which project in longitudinally opposite directions from the coupler into matching grooves 58, 59 respectively formed in the input and output discs. The associated tongues and grooves respectively include laterally and longitudinally extending parallel surfaces 60, 62 which contact one another to apply torque and maintain the various discs in fixed angular relationship during rotation around their respective axes.

It should be apparent that many forms of torque transmitting constructions may be utilized in place of and in variations upon the tongue and groove construction illustrated. Thus the surfaces 60, 62 need not be parallel to one another or to the longitudinal axis. Also other alternative torque transmitting devices having equivalent function may be substituted such as balls, rollers or pins in place of the tongues as long as the function to be subsequently described is maintained. It is necessary that the coupler 48 be free for relative motion laterally in one transverse plane with respect to the end member 46 and in another substantially different transverse plane with respect to the end member 47. For this reason the tongues 55, 56 and their corresponding grooves in the opposite end members are arranged at right angles to one another as projected on a plane of rotation. While such a right angle arrangement is desirable for the intended purpose, it is not absolutely required in that other angles of substantial difference such as 60 or 70 degrees can also provide operable constructions. Further, it would be possible to utilize arcuately formed tongues and grooves rather than straight. Other curvilinear shapes also may be utilized, if desired, for specific purposes. The term "Oldham coupling" as used herein is intended to include all functionally equivalent devices that may be known or developed.

The operation of the coupling portion of the embodiment so far described is best illustrated in FIG. 5, where 63 denotes the rotational axis of the input disc 50 and 64 denotes the rotational axis of the output disc 52. Point 66, the midpoint between axes 63 and 64 is also the oribital center about which the geometric center 67 of the coupler disc 48 orbits.

When the input disc 50 is driven at a constant angular velocity, the coupler 48 and the output disc 52 will also rotate at the same constant angular velocity. Moreover, the geometric center 67 of the coupler 48 describes a circle 68 as it orbits around the central point 66, the circle passing through the axes 63, 64 of the input and output discs and having a diameter equal to the distance therebetween.

Under the given conditions, the rotational orbiting speed of the center of the coupler disc 48 around its circular path 68 is a constant angular velocity exactly twice the angular velocity, or rotational speed at which the input and output discs and the coupler are rotated. Further, while the input and output discs rotate on their geometric axes, the orbiting of the coupler disc 48 creates a rotating centrifugal force which is determined by the mass of the disc 48, the diameter of the circular orbit 68 and the speed of rotation of the coupling. This centrifugal force is thus available to be utilized for balancing opposing forces occurring in the engine or other attached mechanism and it is to this feature that the present invention is directed.

In the engine application of FIGS. 1 and 2, two Oldham coupling devices 44 are utilized, the phase angles of which are so arranged that the orbiting coupler discs provide oppositely rotating forces phased to be additive in the upward and downward directions and to oppose one another in the lateral directions so as to provide a resultant vertical shaking force.

In operation, rotation of the crankshaft 12 operating through the gear train 40, 39, 38, 36 causes opposite rotation of the parallel balancer shafts and their connected coupling devices 44. The associated couplers orbit in opposite directions at twice crankshaft speed and, through proper phasing, the eccentric forces of the orbiting couplers combine to provide a vertical second order shaking force having a frequency equal to twice engine speed. The resultant shaking force is so timed, by appropriate physical location of the balancer elements as to directly oppose the secondary shaking force inherent in the four cylinder four stroke engine to which the balancer is applied. Thus by proper selection of the mass of the couplers 48 and their eccentricities, determined by the offset between the end member axes 63 and 64, a balancing force is developed which exactly counterbalances the secondary shaking force of the engine. This is accomplished with a balancer which is operated at the primary rotational speed of the engine. In this manner bearing friction and gear noise for a secondary vibration engine balancer are minimized. It should also be obvious that the half speed balancer described could be utilized to offset primary unbalance in an unbalanced mechanism by merely operating the balancer at half the cyclic unbalance speed of the mechanism and by properly arranging the eccentric weight or weights to oppose the unbalanced condition to be balanced. Thus the benefits of the half speed operation of the balancer can be applied to nearly any sort of unbalanced mechanism condition.

FIG. 6 illustrates one of many possible alternative embodiments of an Oldham coupling for a half speed balancer in accordance with the invention. The coupling 70 has end members 71, 72 having spaced tongues 74 engaging oppositely directed grooves 75 in a connecting coupler 76. The operation of the construction is the same as that for the embodiment previously described in that, upon rotation of the coupling, the coupler 76 orbits at a frequency twice that of the rotational speed of the coupling itself.

FIG. 7 shows yet another possible embodiment of Oldham coupling device and the one presently preferred for use in a half speed balancer in accordance with the invention. Coupling 78 includes end members 79, 80 having forklike opposed longitudinal projections 82 which extend around four sides of a cubical coupler block 83. Laterally and longitudinally extending internal surfaces 84 of the projections 82 engage the corresponding laterally and longitudinally extending outer surfaces 86 of the block 83. The longitudinal axes of the end members 79, 80 are offset so that, upon rotation, the coupler block 83 orbits in the manner of the previously described couplers around a circular path at an orbiting speed twice that of its rotational speed and that of the end members.

The embodiment of FIG. 7 also includes a pressure lubrication system that includes crossdrilled oil passages 87 in the bearing supported end member input and output shafts 88, 90 respectively. The passages 87 connect with longitudinal passages 91 that communicate through opposing conical recesses 92, 94 in opposing end faces 95, 96 of the end members and block respectively with a longitudinal passage 98 in the block. Passage 98 in turn connects with transverse passages 99 leading to the block outer surfaces 86.

In operation, lubricating oil is received from the pressure lubricated bearings supporting the input and output shafts 88, 90 of the end members 79, 80 and is delivered through the transverse passages 87 and longitudinal passages 91 to the longitudinal passage 98 of the block and thence to the lateral passages 99. From passages 99 the oil is delivered directly between opposing surfaces 84, 86 of the end members and block respectively to provide a friction reducing and cooling supply of pressure lubricant on these load carrying surfaces. Tests have shown that the use of such a pressure lubricating system provides the capability of operation at substantially higher speeds without excessive heating through friction than would otherwise be the case.

As an optional feature of the embodiment of FIG. 7, there are shown on the end members 79, 80 eccentric weights exemplified by projections 100. These weights are phased to provide in combination a rotating unbalanced force, operative at the primary rotational speed of the coupling, which may be used in combination with other primary balance weights in the associated mechanism, or with additional coupling devices, to offset primary unbalance in the associated engine or other mechanism, while the rotating unbalance force of the coupler block oribiting at twice the rotational speed of the coupling is usable to offset secondary unbalance forces in the associated engine or mechanism. Such an application of unbalance weights could, of course, be made to shafts associated with the couplings and would be applicable to any of the arrangements previously described as well as to others.

Referring now to FIG. 8 of the drawings, an unusual alternative embodiment of balancer coupling is illustrated which is suitable for mounting in an engine or mechanism in a bulkhead through which the crankshaft or other drive shaft passes. The arrangement includes a crankshaft 102 rotating on an axis 103. The crankshaft extends through a bulkhead 104 supporting a bearing 105 within an opening 106 surrounding the crankshaft and centered on an axis 107 parallel with and spaced from the crankshaft axis 103. A sliding block 108 is retained between opposed fork-like projections 110 forming part of the crankshaft and opposing bearing pads 111 mounted for rotation within the bearing 105 about the axis of the opening 106. A hole 112 through the center of the block allows passage of the crankshaft therethrough.

In operation, rotation of the crankshaft rotates the sliding block which drives the pads 111 within bearing 105. This causes the block 108 to orbit in a circular path at a speed double the speed of crankshaft rotation to provide a balancing force determined by the mass of the block, the eccentricity of the orbit and the rotating speed in the same manner as in the arrangements previously described.

It should be apparent that, while the application of a half speed balancer to an engine has been described by reference to a specific arrangement for balancing vertical shaking forces, Oldham coupling balancers in accordance with the present invention could be used in any suitable manner of application, utilizing one or more couplings, in which the eccentric weights of conventional balancing shaft arrangements might be ordinarily utilized. In addition, the construction of the coupling devices themselves may be formed in any suitable configuration capable of functioning as an Oldham coupling or modified Oldham coupling device in accordance with the invention. Since the several arrangements illustrated are intended solely for descriptive purposes, it is intended that the invention not be limited except by the language of the following claims.

The embodiments of the invention in which an exclusive property or privilege is claimed are defined as follows;

1. In combination, support means carrying operable mechanism including a rotatable crank connected with a plurality of reciprocable members and having in operation a repetitious unbalance occurring in a cycle at twice the rotational speed of the crank, and a half speed balancer comprising at least one Oldham coupling device having a pair of end members rotatably connected by a coupler between the end members, said end members being mounted to said support means for rotation on offset parallel axes and at least one of said end members being connected to be driven at a rotational speed equal to that of the crank, said coupler being connected to said end members by abutments contacting along laterally and longitudinally extending surfaces, the surfaces associated with the diverse end members lying at substantial rotational angles to one another such that said coupler is rotatably driven by said end members at a speed equal to the rotational speed of the end members while being eccentrically displaced such that the center of gravity of the coupler travels in a closed curving path at a rotational speed equal to the cyclic speed of the repetitious unbalance, said Oldham coupling device being so oriented as to effect the displacement of said coupler in a manner to oppose at least a portion of said mechanism cyclic unbalance and the mass of said coupler being chosen to offset a predetermined part of said opposed portion of mechanism unbalance.

2. In combination, an internal combustion engine supporting operable mechanism including a rotatable crankshaft connected with a plurality of pistons reciprocable within cylinders having in operation a repetitious unbalance occurring in a cycle at twice the crankshaft rotational speed, and a half speed balancer comprising at least one Oldham coupling device having a pair of end members rotatably connected by a coupler between the end members, said end members being mounted to said engine for rotation on offset parallel axes and at least one of said end members being connected to be driven at a rotational speed equal to that of the crankshaft said coupler being connected to each of said end members by abutments contacting along a pair of laterally and longitudinally extending parallel surfaces, said pair of surfaces associated with the diverse end members lying at right angles to one another such that said coupler is rotatably driven by said end members at a speed equal to the rotational speed of the end members while being eccentrically displaced such that the center of gravity of the coupler travels in a circular path at a rotational speed equal to the cyclic speed of the repetitious unbalance, said Oldham coupling device being so oriented as to effect the displacement of said coupler in a manner to oppose at least a portion of said mechanism cyclic unbalance and the mass of said coupler being chosen to offset a predetermined part of said opposed portion of mechanism unbalance.

3. In combination, support means carrying operable mechanism including a rotatable crank connected with a plurality of reciprocable members and having in operation a repetitious unbalance occurring in a cycle at twice the rotational speed of the crank, and a half speed balancer comprising at least one Oldham coupling device having a pair of end members rotatably connected by a coupler between the end members, said end members being mounted to said support means for rotation on offset parallel axes and at least one of said end members being connected to be driven at a rotational speed equal to that of the crank said coupler being connected to said end members by abutments contacting along laterally and longitudinally extending surfaces, the surfaces associated with the diverse end members lying at substantial rotational angles to one another such that said coupler is rotatably driven by said end members at a speed equal to the rotational speed of the end members while being eccentrically displaced such that the center of gravity of the coupler travels in a closed curving path at a rotational speed equal to the cyclic speed of the repetitious unbalance, lubrication passages in the end members for distributing lubricant to the contacting surfaces, said Oldham coupling device being so oriented as to effect the displacement of said coupler in a manner to oppose at least a portion of said mechanism cyclic unbalance and the mass of said coupler being chosen to offset a predetermined part of said opposed portion of mechanism unbalance.

4. In combination, support means carrying operable mechanism including a rotatable crank connected with a plurality of reciprocable members and a half speed balancer comprising at least one Oldham coupling device having a pair of end members rotatably connected by a coupler between the end members, said end members being mounted to said support means for rotation on offset parallel axes and at least one of said end members being connected to be driven at a rotational speed equal to that of the crank, said coupler being connected to each of said end members by abutments contacting along a pair of laterally bers by abutments contacting along a pair of laterally and longitudinally extending parallel surfaces, said pairs of surfaces associated with the diverse end members lying at right angles to one another such that said coupler is rotatably driven by said end members at a speed equal to the rotational speed of the end members while being eccentrically displaced such that the center of gravity of the coupler travels in a circular path at a rotational speed equal to the cyclic speed of the repetitious unbalance, lubrication passages in the coupler and end members for distributing lubricant to the contacting surfaces, said Oldham coupling device being so oriented as to effect the displacement of said coupler in a manner to oppose at least a portion of said mechanism cyclic unbalance and the mass of said coupler being chosen to offset a predetermined part of said opposed portion of mechanism unbalance.

5. An internal combustion engine having four in-line cylinders with axes lying in a common plane and a crankshaft in said plane and connected with pistons in the cylinders, the engine being substantially balanced except for second order vibrational forces parallel to the cylinder axes;

a pair of countershafts connected to be driven at engine speed in opposite rotation and located parallel to each other on axes parallel to the crankshaft and equidistant from the plane of the cylinder axes, each said countershaft terminated substantially at the engine longitudinal center;

a pair of idler shafts located on axes parallel to the axes of said countershafts, respectively, but offset like distances from the axes of their respective countershafts and terminating in face-to-face relation, respectively with said countershafts, and a pair of couplers located between and coupling the facing ends of the respective countershafts and idler shafts, said couplers being constrained to positions on diametral lines through the shafts and crossed in relation to each other such that upon rotation of the shafts said couplers perform eccentric orbits of equivalent exent at twice engine speed, and the masses of said coupling elements being sized and oriented such as to cause combined vibrational second order forces that substantially exactly balance the unbalanced second order forces on the engine crankshaft.

6. An internal combustion engine having a plurality of in-line cylinders with axes lying in a common plane and a crankshaft extending parallel with said plane and connected with pistons in the cylinders, the engine having unbalanced second order vibrational forces;

a balancer driveshaft connected to be rotatably driven at engine speed on an axis parallel to the crankshaft, said driveshaft terminated substantially at the engine longitudinal center;

an idler shaft located on an axis parallel to but offset from the axis of said driveshaft and terminating in face-to-face relation with said driveshaft, and a coupler located between and coupling the facing ends of the driveshaft and idler shaft, said coupler being constrained to positions on diametral lines through the shafts and crossed in relation to each other such that upon rotation of the shafts said speed, and the masses of said couplers being sized and oriented such as to cause combined vibrational second order forces that substantially exactly balance the unbalanced second order forces on the engine crankshaft. See claim 6.

* * * * *

UNITED STATES PATENT AND TRADEMARK OFFICE
CERTIFICATE OF CORRECTION

PATENT NO. : 4,440,123
DATED       : April 3, 1984
INVENTOR(S) : Lung-Wen Tsai

It is certified that error appears in the above—identified patent and that said Letters Patent is hereby corrected as shown below:

Cover page, at [56] References Cited, under heading U.S. PATENT DOCUMENTS, add -- 2,498,877  2/1950 Candor 74/603 --.

Column 1, line 42, after "well" delete the comma.

Claim 4, delete line 13.

Claim 5, fifth from last line, change "coupling elements" to -- couplers --.

Claim 6, change last five lines to read -- coupler performs an eccentric orbit at twice engine speed, the mass of said coupler being sized and oriented such as to cause vibrational second order balancing forces that balance at least a portion of the unbalanced second order forces of the engine. --

Signed and Sealed this

Twenty-first Day of May 1985

[SEAL]

Attest:

DONALD J. QUIGG

Attesting Officer    Acting Commissioner of Patents and Trademarks